Aug. 2, 1938.  V. DAHLMAN  2,125,271

PAINT SPRAY FILTER

Filed May 1, 1936

INVENTOR.
Verner Dahlman
BY *Arthur F. Robert*
ATTORNEYS.

UNITED STATES PATENT OFFICE 2,125,271

PAINT SPRAY FILTER

Verner Dahlman, New Lenox, Ill., assignor to Independent Air Filter Company, Chicago, Ill., a corporation of Illinois Application May 1, 1936, Serial No. 77,354

5 Claims. (Cl. 183—75)

Various types of air filter structures have been proposed up to the present time for filtering the air passing from a paint spray booth. Of such of these filters as are better adapted for this particular purpose it is possible that none of them operates with an efficiency substantially greater than 80% and certain that none produces an efficiency as close to 100% as is highly desirable. The present invention is directed to a filter structure which, while generally useful, is particularly suited for the filtration of paint spray.

The principal object of the invention is to produce a filter having an efficiency closely approximating 100%.

Another object is to accomplish the foregoing objective in a filter unit which is of more or less standard character and which meets, in a highly satisfactory manner, the other requirements of commercial filters, such as low cost, low operating resistance, long operating period between cleaning intervals, and ease of cleaning.

The invention is illustrated in the accompanying drawing wherein.

Figure 1:
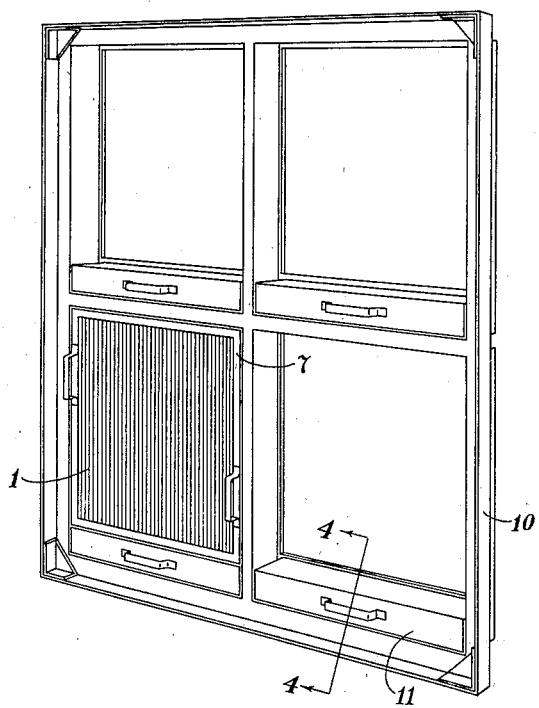
Figure 1 is a perspective of a suitable frame with one unit in place.
Figure 3:
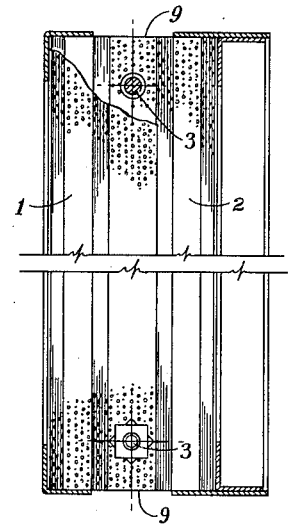
Figure 3 is a vertical section through the filter unit taken in the general direction of air flow but showing the plates in elevation with a plate of the front series partly broken near the top.
Figure 2:
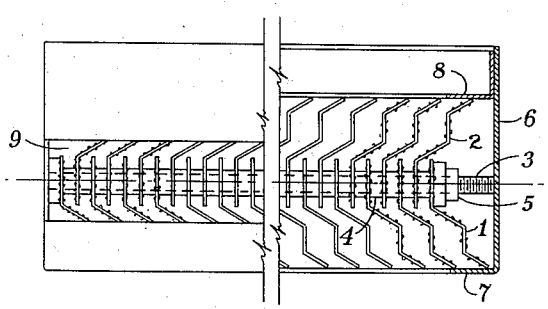
Figure 2 is a top plan view of a filter unit with the frame broken away below line 3—3 to show the arrangement of the filter plates, the size of the frame being enlarged and the number of plates normally used reduced to permit clearer illustration of the structure.
Figure 4:
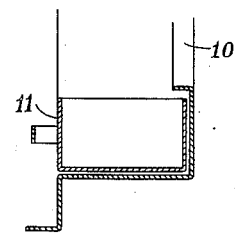
Figure 4 is a section taken through line 4—4 of Figure 1.

In carrying out my invention I provide a filter medium composed of a series of spaced parallel front plates 1 and a similar series of rear plates 2. Both front and rear plates are suitably bent in a zigzag manner to provide tortuous passages and are roughened to produce a scrubbing effect on the passing air. The front series of plates is staggered relatively to the rear series while both series are brought together sufficiently to cause the plates of each series to bisect or divide longitudinally a substantial part of the adjacent portion of each air passage of the other series. In other words, the adjacent end portions of each series are placed in substantial interjacent relationship. I have found that the foregoing arrangement of plates will produce a cleaning efficiency approximating 100% when the air flow passages of the interjacent area range in width between .17 and .22 inches. In this connection it may be noted that ordinarily the amount of particles deposited, progressively decreases from the upstream portion or front to the rear of the filter with the front portion receiving say 70% of all particles deposited, the central section 25% and the rear 5%. In the present structure, however, the central or what may be termed the interjacent section of the filter receives perhaps as much as 75% of the deposit and the front section 25% while the deposit on the rear section is negligible.

The filter plates of both series may be mounted in any suitable manner within a suitable frame with the proposed arrangement. However, the plates can be easily, quickly and inexpensively assembled into and fixedly secured as a unit of desired size simply by passing a pair of spaced bolts 3 relatively through the interjacent section of the filter, spacing each plate of one series from the adjacent plate of the next series by an annular ring or spacer 4 placed over each bolt and then fixing the plates and spacers with a securing nut 5 on each bolt.

The plates thus assembled may be placed as a unit into any suitable frame. In the drawing the frame 6 illustrated has its front marginal edge turned inwardly to provide a flange 7 which delimits the front face opening and against which the plates abut. The rear end of the frame may be likewise arranged but preferably for the sake of economy the rear marginal edge extends rearwardly beyond the rear edge of the plates sufficiently to provide a seat upon which L shaped flange members 8 may be secured in any desirable way after the unit has been inserted. The lower end of the frame, and if the filter is reversible, i. e., operable up side down, the upper end also, may be provided with a long relatively narrow opening 9 extending across its width and exposing the interjacent area of the plates for a purpose hereinafter described.

Unit filters are ordinarily removably placed in a bank of openings provided by an auxiliary frame which is permanently mounted across the air path. A frame 10 of this general character with one unit in place is illustrated in Figure 1. Where the installation is used to filter fast drying paints, lacquers, varnishes, etc., it will be necessary to remove and clean the unit from time to time. However, where slow drying materials are filtered a considerable portion of them will run or drop to the bottom of the filter unit. Accordingly to increase the operating period of such units the auxiliary frame 10 is provided at the bottom of each filter unit opening with a drawer 11 opening upwardly to receive the material passing from the bottom of the filter unit through the filter unit opening 9. In this manner some of the paint may be recovered and perhaps reused. Naturally the deposit in the unit under such conditions of use will increase more gradually than is the case where fast drying materials are being filtered and will therefore require cleaning only at longer intervals of time.

From the foregoing it will be appreciated that the filter unit is more or less of standard character, that it can be manufactured at low cost, that due to its more or less unobstructed passages it will have a low operating resistance and a long operating period and that when cleaning is necessary it will be easy to clean. These advantages in addition to its exceptionally high cleaning efficiency renders it particularly suited for paint spray work although as will be evident it is generally useful for other purposes.

Having described my invention, I claim:

1. A filter medium comprising a front series of spaced parallel plates and a rear series of spaced parallel plates, each series being staggered relatively to each other and bruoght together sufficiently to place their adjacent parallel end portions in substantial interjacent relationship, said plates being correspondingly bent in a zig-zag manner so as to provide tortuous air passages.

2. A filter medium comprising a front series of spaced parallel plates and a rear series of spaced parallel plates, each series being staggered relatively to each other and brought together sufficiently to bring their adjacent parallel end portions in substantial interjacent relationship, said plates being correspondingly bent in a zig-zag manner and spaced to provide tortuous air passages which in the interjacent area range between .17 and .22 inches in width.

3. A filter medium comprising a front series of spaced parallel plates, a rear series of spaced parallel plates, each series being staggered relatively to each other and brought together sufficiently to place their adjacent end portions in substantial interjacent relationship, said plates being bent to provide tortuous air passages, and means alternately engaging the plates of each series in the interjacent area to hold them as a unit, said means extending transversely across the unit in relation to the general direction of the air passages through the unit.

4. A filter medium comprising a front series of spaced parallel plates, a rear series of spaced parallel plates, each series being staggered relatively to each other and brought together sufficiently to place their adjacent end portions in substantial interjacent relationship, said plates being bent to provide tortuous air passages, and spaced bolts passing transversely through the interjacent area of said plates to hold them as a unit.

5. A filter unit comprising a frame having open front and rear faces, a front and rear series of spaced plates vertically arranged within said frame, each series being staggered relatively to the other and brought together sufficiently to place their adjacent end portions in substantial interjacent relationship, said plates being bent to provide vertical air passages extending from the front opening rearwardly toward the rear opening of said frame and said frame having at its bottom an opening which exposes the interjacent area of said plates.

VERNER DAHLMAN.